US009212092B2

(12) United States Patent
Herfort et al.

(10) Patent No.: US 9,212,092 B2
(45) Date of Patent: Dec. 15, 2015

(54) PORTLAND LIMESTONE CALCINED CLAY CEMENT

(75) Inventors: Duncan Herfort, Skørping (DK); Jesper Sand Damtoft, Aalborg (DK)

(73) Assignee: AALBORG PORTLAND A/S, Aalborg Ost (DK)

( * ) Notice: Subject to any disclaimer, the term of this patent is extended or adjusted under 35 U.S.C. 154(b) by 254 days.

(21) Appl. No.: 13/319,858

(22) PCT Filed: Apr. 9, 2010

(86) PCT No.: PCT/EP2010/054713
§ 371 (c)(1),
(2), (4) Date: Nov. 10, 2011

(87) PCT Pub. No.: WO2010/130511
PCT Pub. Date: Nov. 18, 2010

(65) Prior Publication Data
US 2012/0055376 A1    Mar. 8, 2012

Related U.S. Application Data

(60) Provisional application No. 61/213,174, filed on May 14, 2009.

(30) Foreign Application Priority Data

May 14, 2009    (EP) ..................................... 09160271

(51) Int. Cl.
| C04B 28/04 | (2006.01) |
| C04B 7/36 | (2006.01) |
| C04B 20/04 | (2006.01) |
| C04B 28/00 | (2006.01) |
| C04B 28/06 | (2006.01) |
| C04B 111/00 | (2006.01) |

(52) U.S. Cl.
CPC ................ C04B 7/367 (2013.01); C04B 20/04 (2013.01); C04B 28/008 (2013.01); C04B 28/04 (2013.01); C04B 28/065 (2013.01); C04B 2111/00017 (2013.01)

(58) Field of Classification Search
CPC ...... C04B 7/367; C04B 20/04; C04B 28/008; C04B 28/04; C04B 28/065; C04B 14/106; C04B 14/28; C04B 20/008; C04B 22/147; C04B 18/023; C04B 7/02; C04B 18/022
USPC .................... 106/713, 718, 738, 739
See application file for complete search history.

(56) References Cited

U.S. PATENT DOCUMENTS

| 1,521,967 | A | | 1/1925 | Powers | |
| 4,737,191 | A | * | 4/1988 | Meynardi ...................... | 106/811 |
| 4,842,649 | A | | 6/1989 | Heitzmann et al. | |
| 5,584,926 | A | * | 12/1996 | Borgholm et al. ............ | 106/713 |
| 5,626,665 | A | * | 5/1997 | Barger et al. ................. | 106/706 |
| 5,788,762 | A | * | 8/1998 | Barger et al. ................. | 106/706 |
| 6,027,561 | A | * | 2/2000 | Gruber et al. ................ | 106/718 |
| 6,030,447 | A | * | 2/2000 | Naji et al. .................... | 106/718 |
| 6,645,289 | B2 | * | 11/2003 | Sobolev et al. ............... | 106/705 |
| 7,182,137 | B2 | | 2/2007 | Fyten et al. | |
| 7,303,015 | B2 | * | 12/2007 | Fyten et al. ................... | 166/293 |
| 7,326,291 | B2 | * | 2/2008 | Fyten et al. ................... | 106/713 |
| 7,332,026 | B2 | * | 2/2008 | Fyten et al. ................... | 106/713 |
| 7,735,274 | B2 | * | 6/2010 | Constantz et al. ............. | 52/294 |
| 8,114,214 | B2 | * | 2/2012 | Constantz et al. ............ | 106/738 |
| 8,246,739 | B2 | * | 8/2012 | Schwartzentruber et al. ............................ | 106/713 |
| 8,603,238 | B2 | * | 12/2013 | Schwartzentruber et al. ............................ | 106/705 |
| 2003/0041783 | A1 | * | 3/2003 | Monawar ...................... | 106/716 |
| 2006/0054319 | A1 | * | 3/2006 | Fyten et al. ................... | 166/292 |
| 2010/0212551 | A1 | * | 8/2010 | Meille et al. ................. | 106/708 |
| 2010/0294171 | A1 | * | 11/2010 | Schwartzentruber et al. ............................ | 106/715 |
| 2013/0036948 | A1 | * | 2/2013 | Fernandez et al. ............ | 106/725 |
| 2014/0000491 | A1 | * | 1/2014 | Gasafi et al. ................. | 106/811 |

FOREIGN PATENT DOCUMENTS

| CA | 2562115 A1 | 10/2005 |
| EP | 0 895 971 A1 | 10/1999 |

(Continued)

OTHER PUBLICATIONS

Sabir, et al., "Metakaolin and calcined clays as pozzolans for concrete: a review," Cement & Concrete Composites, (2001), vol. 23, pp. 441-454.
Shvarzman, et al., "The effect of dehydroxylation/amorphization degree on pozzolanic activity of kaolinite," Cement & Concrete Research, (2003), vol. 33, pp. 405-416.
Yip, et al., "Carbonate mineral addition to metakaolin-based geopolymers," Cement & Concrete Composites, (2008), vol. 30, pp. 979-985.
Volzhenskiy et al, "Mineral Binding Substances", Moscow, Stroyizdat, (1979), pp. 362-369 and 372.

(Continued)

*Primary Examiner* — Paul Marcantoni
(74) *Attorney, Agent, or Firm* — Nath, Goldberg & Meyer; Jerald L. Meyer; Tanya E. Harkins

(57) ABSTRACT

The claimed subject matter relates to a novel cement comprising Portland cement clinker and a supplementary cementitious material. The supplementary cementitious material comprises a heat treated clay material and an optionally heat treated carbonate material, wherein the clay material has been heat treated optionally together with the carbonate material in such a way that the heat treated clay material is substantially dehydroxylated while the optionally heat treated carbonate material remains substantially carbonated. This can be achieved by premixing the carbonate and clay materials before heat treating to 400-700 C, or heat treating the clay material separately to a temperature of up to 900 C. When used in the final application the cement results in much higher strengths than would be predict from any other combination of these materials.

21 Claims, No Drawings

(56) References Cited

FOREIGN PATENT DOCUMENTS

| EP | 0 895 972 A1 | 10/1999 |
|---|---|---|
| EP | 2 159 202 A1 | 3/2010 |
| FR | 2 712 882 A1 | 6/1995 |
| WO | 89/02878 A1 | 4/1989 |
| WO | 93/21122 A1 | 10/1993 |
| WO | 2005/097701 A2 | 10/2005 |
| WO | 2007/057510 A1 | 5/2007 |
| WO | 2007057510 A1 | 5/2007 |

OTHER PUBLICATIONS

Bazhenov, "Technology of Dry Building Mixes", Moscow, publishing of Association of constructive IHEs, pp. 61-65.

Gingzburg, "Furnaces and Dryers in Silicate Industry", Moscow, Gislegprom, (1940), pp. 422-423.

Federal Service for Intellectual Property, Russian Office Action, dated Jun. 13, 2013, English Translation, Application No. 2011150391/03(075623), four (4) pages.

Tsivilis, S., et al.,"Use of minral admixtures to prevent thaumasite formation in limestone cement mortar", Cement & Concrete Composites, vol. 25, pp. 969-976, (2003).

"Using Metakaolin in Decorative Concrete Mixes", Concrete Construction, pp. 52-57, (Aug. 2006), XP008112851.

Sabir, B.B., et al., "Metakaolin and calcined clays as pozzolans for concrete: a review", Cement & Concrete Composites, vol. 23, pp. 441-454, (2001).

Pandey, SP.P., et al., "Studies on high-performance blended/ multiblended cements and their durability characteristics",Cement and Concrete Research, vol. 33, pp. 1433-1436, (2003).

Smallwood, I., et al., "The resistance of metakaolin (MK)-Portland cement (PC) concrete to the thaumasite-type of sulfate attack (TSA)-Programme of research and preliminary results", Cement & Concrete Composites, vol. 25, pp. 931-938, (2003).

Office Action in the Counterpart European Application No. 09 160 271.4, Jan. 16, 2014, eight (8) pages.

Yuan, Runzhand, "2.4.1 Structure Evolution in Kaolinite Calcination Process", "Dreams and Pursuits", 1st Edition, Wuhan University of Technology Press, Nov. 30, 2007, pp. 54-57, English statement of relevance attached.

\* cited by examiner

PORTLAND LIMESTONE CALCINED CLAY CEMENT

This is a National Phase Application filed under 35 U.S.C. §371 as a national stage of PCT/EP2010/054713, filed on Apr. 9, 2010, an application claiming the benefit under 35 U.S.C. §119(e) of U.S. Provisional Application No. 61/213,174, filed on May 14, 2009, and an application claiming the benefit under 35 U.S.C. §119 of European Patent Application No. 09160271.4, filed on May 14, 2009, the content of each of which is hereby incorporated by reference in their entirety.

FIELD OF THE INVENTION

The present invention concerns a novel type of cement based on Portland cement clinker and a supplementary cementitious material, which cement retains high mechanical strengths at low clinker contents. The present invention also relates to methods of manufacturing said cement and to concrete materials comprising said cement. In addition, the present invention relates to a use of the supplementary cementitious material for reducing $CO_2$ emissions during the production of cement.

BACKGROUND OF THE INVENTION

Concrete is the most important construction material in the world. It is composed of stone and sand aggregate bound by a cementitious binder. The cementitious binder is manufactured by grinding Portland cement clinker with calcium sulphate with or without additional supplementary cementitious materials or other clinker replacement materials such as limestone (henceforth limestones are also included as supplementary cementitious material). Portland cement clinker is produced through the reaction of limestone with aluminous and ferrous raw materials at 1450-1500° C. in a rotary kiln. The energy consumption needed to heat the material to this high temperature combined with the chemical decomposition (decarbonation) of limestone which liberates $CO_2$ to the atmosphere results in an emission of typically 0.8 kg $CO_2$ per kg clinker produced.

The increasing demand for housing, civil works and industrial buildings in the developing parts of the world has led to a sharp rise in demand for cement. It is expected that the global cement production in 2050 will be more than double the 2010 level. Therefore, there is an urgent need to increase the cement production capacity whilst at the same time reducing the $CO_2$ emissions associated with the production of Portland cement clinker.

An effective way of increasing cement capacity whilst simultaneously reducing $CO_2$ emissions is to replace part of the clinker by supplementary cementitious materials such as fly ash or ground granulated blastfurnace slag. However, the use of supplementary cementitious materials is limited by the availability of suitable materials and technical constraints in the present art which in turn limits the content of clinker which may be substituted.

Portland-limestone cements are widely used in many parts of the world including Europe where they are classified according to EN 197-1:2000 as CEM II/A LL, which apart from clinker as the main constituent can contain up to 20 weight % limestone, or CEM II/B LL cements, which apart from clinker can contain up to 35 weight % limestone.

As a rule, the substitution of Portland cement clinker in the ground cement with limestone of similar or high surface area results in lower strengths since most of the limestone does not react and its effect is mainly one of dilution.

One notable exception is when the limestone is used in conjunction with mineralised clinker as taught in the European patent EP 0 640 062 B1 where higher strengths are obtained than would predicted by the dilution effect on its own. However, even in this case there is a limit to how much limestone can be added to the cement (generally in the region of 10 to 15% clinker replacement) before strengths are significantly reduced. It is of course important when evaluating the information disclosed by EP 0 640 062 B1 or elsewhere in the literature that other factors which may effect strengths such as the fineness of the Portland cement clinker fraction after grinding, or the water to binder ratio (in this case water/(clinker+limestone)) are kept constant. Despite the largely diluting effect of limestone on the standard mortar strengths Portland limestone cements account for approximately a quarter of all cements sold in Europe where it is used to produce relatively low strength concrete and where its main role is to achieve the required cement contents in the concrete mix needed for optimum rheology.

Limestone addition therefore plays an important role in significantly reducing $CO_2$ emissions from clinker production associated with the production of about a quarter of the concrete produced in Europe. However, for the remaining concrete where the contents of other types of Portland cements needed to achieve the concrete strengths specified for a given application are sufficient for optimum rheology and/or specified by the relevant concrete standards Portland limestone cement are generally unsuitable.

For higher strength concretes alternative clinker replacement materials to limestone are needed to reduce the cost of cement production and lower $CO_2$ emissions. A prerequisite for these materials is that they contribute to strength development. Two major classes of these materials exist in the European cement standard, i.e. granulated blastfurnace slag (GBFS), and natural or artificial pozzolans including siliceous fly ash as the most important material in the latter class. Unfortunately, however, the availability of these materials is limited. In Europe for example waste materials such as GBFS and siliceous fly ash are almost fully utilised either in cement production or added directly to the concrete, whilst natural pozzolans such as volcanic ash are not evenly distributed geographically.

One approach to resolve this dilemma is to produce another class of pozzolans by heating clay to between 500° C. and 800° C. as for example taught in the U.S. Pat. No. 5,626,665. Unfortunately, the reactivity of the calcined clay varies according to clay type (Mielenz, R. C., Witte, L. P. & Glantz, O. J. (1950). STP-99, American Society for Testing of Materials. Philadelphis. 43-91. Only mixtures with kaolin obtain strength comparable to pure Portland cement. Intermediate results are obtained by using calcined smectite type clays, whereas illite exhibits limited reactivity.

The result of this is that for most types of clays found in sufficient amounts the contribution to strength has not been satisfactory.

U.S. Pat. No. 4,737,191 describes a product comprising an intimate mixture of clay and limestone which is heat treated in a $CO_2$ atmosphere at 700-900° C. whereby a chemical reaction between limestone and clay is promoted. Thus, a chemical reaction occurs between the clay minerals and the carbonate. However, the strength reported is significant lower than a state-of-the art pure Portland cement.

U.S. Pat. No. 1,521,967 relates to a dry mortar mixture containing sand, Portland cement, clay and limestone. Prior to mixing of the components, the pulverised limestone is heated to 1200° F. (650° C.) and the clay is heated to 900° F. (482° C.; column 2, lines 69-84). The purpose of heating the clay to this comparatively low temperature is merely stated as drying the material. Significantly, U.S. Pat. No. 1,521,967 is silent on mortar strength of the obtained material.

European Patent Application EP 0 895 972 A1 relates to an alkaline aluminoferrosilicate hydraulic cement which may contain Portland cement clinker, metakaolin and dolomite sintered at 800-950° C. As acknowledged in EP 0 895 972 A1, the high temperature heat treatment leads to a full decomposition and decarbonation of dolomite to CaO and MgO.

U.S. Pat. No. 6,030,447 discloses a formulation for preparing an autoclave cured cementitious material, said material comprising a cementitious material such as Portland cement and/or lime (CaO), a siliceous material such as ground sand, and a dehydroxylated clay mineral such as metakaolin. U.S. Pat. No. 6,030,447 is concerned with improving water permeability of the obtained material and is thus silent on $CO_2$ reduction potential in relation to standard cement strength.

Thus, there is a need in the art for cements having a satisfactory strength but which use less energy and emit lower amounts of $CO_2$ when produced.

It is therefore one object of the invention to provide a cement at lower net $CO_2$ emissions having the same level of concrete performance.

It is another object of the present invention to provide a cement with a comparatively high content of supplementary cementitious material, which cement retains a high compressive strength.

SUMMARY OF THE INVENTION

Surprisingly, the present inventers found that when the supplementary cementitious materials consist of a mixture of a carbonate material and a heat treated clay material this resulted in a cement having the desired properties. The present invention therefore relates to a cement comprising Portland cement clinker and a supplementary cementitious material, characterised in that the supplementary cementitious material comprises a heat treated clay material and an optionally heat treated carbonate material, wherein the clay material has been heat treated optionally together with the carbonate material in such a way that the heat treated clay material is substantially dehydroxylated while the optionally heat treated carbonate material remains substantially carbonated.

In addition, the present invention relates to a method of producing a cement comprising Portland cement clinker and a supplementary cementitious material comprising the steps of a) providing a carbonate material and a clay material, b) heating a mixture of the clay material and the carbonate material to a temperature of between 400 and 700° C., and c) blending the mixture with a Portland cement clinker.

Furthermore, the present invention relates to a method of producing a cement comprising Portland cement clinker and a supplementary cementitious material comprising the steps of a) providing a carbonate material and a clay material, b) heating the clay material separately in such a way that the clay material is substantially dehydroxylated, c) mixing the heat treated clay material with the carbonate material, and d) blending the mixture of c) with a Portland cement clinker.

Further the invention relates to a use of the supplementary cementitious material of the present invention for reducing $CO_2$ emissions during the production of cement.

DEFINITIONS

As used herein, the term "% w/w" refers to weight percentage on a dry materials weight basis, unless indicated otherwise. Also, throughout this specification weight ratios are expressed on a dry materials weight basis.

As used herein, the term "carbonate material" refers to a solid material composed primarily (75% w/w or more) of carbonate minerals such as the minerals calcite ($CaCO_3$) or dolomite ($CaMg(CO_3)_2$). Examples of carbonate materials are limestone, dolomite or chalk.

As used herein, the term "clay material" refers to a solid material composed primarily (75% w/w or more) of clay minerals such as minerals belonging to the kaolin group, or the smectite group, or the vermiculite group, or mixtures thereof.

The skilled person will understand that a given "clay material" or a given "carbonate material" may have different properties before and after heat treatment, respectively. Thus, a "heat treated clay material" may have different properties as compared to the original clay material prior to heating. The same may apply to carbonate materials.

Throughout this specification the chemical composition of Portland cement and limestone are as defined in the European harmonised standard for common cements, EN 197-1:2000 unless otherwise stated. The contents of limestone and calcined clay (calcined clay is treated here as a major constituent) are calculated in relation to the sum of minor and major constituents in accordance with EN 197-1:2000, and where calcium sulphate additions are not included in the calculation. Unless otherwise stated the sulphate content is assumed to be optimised to an $SO_3$ content of up to 4.0% in the final cement, and the strengths mentioned refer to mortar strengths determined by the European standard EN 196-1:1995. The term SCM which stands for Supplementary Cementitious Material includes all the constituents defined in EN 197-1:2000 as major constituents except for the Portland cement clinker. This also includes limestone which in the literature is not always classified as an SCM.

Determination of the specific surface area of the carbonate material is performed using the Blaine method described in EN 196-6:1989.

Determination of the size distribution of materials in this invention is according to ASTM C 430-96 (2003).

As referred to herein, the $C_3S$ content of Portland cement clinker is calculated according to the ASTM standard, C150-04.

As used herein, the term "decarbonation" refers to release of $CO_2$ from carbonate materials upon heating. An example of a decarbonated material is quicklime (also known as lime) which mainly consists of CaO with MgO as secondary compound. Quicklime is produced by heating of limestone (mainly $CaCO_3$) to temperatures of above 900° C. At this temperature calcium and magnesium carbonates dissociate into the respective oxides and carbon dioxide. Prior to heating in quicklime production, the limestone meets the requirement of being "substantially carbonated" since decarbonation due to heating has not yet taken place, whereas the finished quicklime would no longer meet this requirement. The term "substantially carbonated" refers to a situation where, after heat treatment, the calcium carbonate ($CaCO_3$) content calculated from the calcium oxide content is at least 90% w/w of the pre-heating calcium carbonate content calculated from the calcium oxide content. This also applies to other carbonates such as $MgCO_3$. Where the carbonate material is heat treated separately the $CaCO_3$ content can be determined by quantitative X-ray diffraction or from the $CO_2$ content, e.g. by thermogravimetry, while the CaO content can be determined from quantitative X-ray diffraction. In heat treated mixtures (clay material plus carbonate material) some of the CaO may have reacted to form calcium silicates.

In this situation, the decarbonation of the original limestone can also be determined by quantitative X-ray diffraction. In embodiments of the present invention where the carbonate material is not heat treated, i.e. where heat treated clay material is mixed with untreated carbonate material such as limestone to form the supplementary cementitious material, the term "substantially carbonated" obviously applies to the unheated carbonate material. Hence, in this case the carbonate material remains substantially carbonated since it has not been heat treated.

As used herein, the term "dehydroxylation" refers to the loss of one or more hydroxy (OH) groups as water ($H_2O$) from clay minerals upon heating of a given clay material. For example, when heating the clay mineral kaolinite from 300 to 600° C. water is lost according to the following reaction (e.g., Suitch P R, J. Am. Ceram. Soc., 69 [1], 61-65, 1986):

$$Al_2Si_2O_5(OH)_4 \rightarrow Al_2Si_2O_7 + 2H_2O \qquad (eq.\ 1)$$

The resulting metakaolinite ($Al_2Si_2O_7$) is accordingly a dehydroxylated material.

The term "substantially dehydroxylated" refers to a situation where, due to heat treatment, the clay minerals in the respective clay material have lost at least 70% (mol/mol) of their OH groups present before the heat treatment. In the aforementioned reaction of kaolinite to metakaolinite (eq. 1) 100% of the four originally present OH groups are lost. Thus, a heat treated clay material consisting of metakaolinite minerals of eq. 1 would meet the requirement of being "substantially dehydroxylated". The mineralogical composition of the clay material may be assessed by X-ray diffraction (XRD), differential thermal analysis (DTA), and/or Fourier transform infra-red spectrometry (FTIR). The degree of dehydroxylation can be determined by thermogravimetry and/or DTA (e.g. Bich et al., Applied Clay Science, 44 (2009) 194-200). In addition, the clay content as such can be determined by a suitable method for measuring the acid soluble residue and/or by quantitative X-ray diffraction.

As referred to herein, the term "28-day compressive strength" refers to a standard strength of cement determined according to EN 196-1:1995.

All other terms should be understood in their usual meaning in the art, as indicated in EN 197-1:2000, unless a differing definition is given herein.

DETAILED DESCRIPTION OF THE INVENTION

It has now been surprisingly found that one or more of the above-mentioned objects is achieved by providing a cement comprising Portland cement clinker and a supplementary cementitious material, characterised in that the supplementary cementitious material comprises a heat treated clay material and an optionally heat treated carbonate material, wherein the clay material has been heat treated optionally together with the carbonate material in such a way that the heat treated clay material is substantially dehydroxylated while the optionally heat treated carbonate material remains substantially carbonated. Surprisingly, novel cements produced from mixtures of heat treated clay material, carbonate material and Portland cement clinker usually mixed with small amounts of sulphate retarder have been shown to result in significantly higher strengths at practically all content levels of supplementary cementitious material than would be expected from the individual binary systems alone, i.e. Portland cement+carbonate material, or Portland cement+heat treated clay material. The clay material is preferably either calcined clay, an aluminosilicate glass or a calcium aluminosilicate glass. The surprising effect is found when treating the raw materials in such a way that the clay minerals are dehydroxylated without substantially decarbonating the carbonate material. This can be achieved either by calcining the clay separately before mixing with the carbonate material (e.g. limestone), or by preblending the two constituents before heat treatment but where the calcination temperature is kept sufficiently low at no more than 700° C. so that the carbonate material does not decarbonate or react with the clay material to form new minerals.

Hence, according to a preferred embodiment of the inventive cement, only the clay material has been heat treated. In other words, the carbonate material has not been heat treated. One way of ensuring that the clay minerals and the carbonate material are in their desired state is by processing the clay minerals and the carbonate material separately. According to this embodiment, the clay material is processed by heat treatment, whereby calcined clay may be formed. The calcined clay may then be mixed with a carbonate material such as limestone, which has not been heat treated. This mixture is then blended with the Portland cement clinker and advantageously a small amount of a sulphate-containing material such as gypsum to yield the inventive cement.

According to another embodiment of the present invention the carbonate material and the clay material have been heat treated together at a temperature of between 500 and 700° C. This temperature range serves two purposes: (i) it leads to substantial dehydroxylation of the clay material, and (ii) it prevents decarbonation of the carbonate material, i.e. the carbonate material remains substantially carbonated. It is thus ensured that the heat treated clay material and the heat treated carbonate material are in their desired state. The exact temperature may depend on the materials used but is generally between 500 and 700° C. This temperature range also prevents potential reactions between the carbonate material and the clay material.

The inventors have surprisingly found that the cements according to the present invention comprising Portland cement clinker and the mixtures of the heat treated clay material and the optionally heat treated carbonate material exhibit much higher strengths than would be predicted from the strengths achieved with two-constituent blends on their own, i.e. Portland limestone blends and Portland calcined clay blends, or Portland aluminosilicate glass blends.

According to another embodiment of the present invention the heat treated clay material is an aluminosilicate glass or a calcium aluminosilicate glass containing up to 35% w/w of CaO. This may be achieved by heating the clay material— separately from the carbonate material—to a temperature of more than 1000° C., preferably higher than 1100° C., to form an aluminosilicate glass. This glass may then be cooled in air without recrystallising and may subsequently be ground to a specific surface area in excess of 3000 cm²/g. It may then be blended with limestone and Portland cement clinker plus preferably a small amount of a sulphate-containing material after these have been pre-ground to the desired specific surface area of more than 3000 cm²/g. Optionally, the alumino silicate glass is ground together with the limestone and Portland cement clinker. The clay material heat treated in this way may optionally also contain up to 35% by mass of calcium oxide in which the untreated clay is premixed with limestone, or a calcium silicate such as wollastonite, or a calcium aluminosilicate such as anothotite (or the anorthotite bearing rock anorthosite) or blast furnace slag.

According to another embodiment of the present invention the heat treated clay material is calcined clay. Advantageously, the calcined clay has been calcinated at a temperature between 400° C. and 900° C.

According to another embodiment of the present invention the heat treated clay material is calcined clay produced at a temperature of between 500° C. and 900° C.

According to another embodiment of the present invention the heat treated clay material is calcined clay produced at a temperature of between 500° C. and 750° C.

According to another embodiment of the present invention the heat treated clay material is produced by heat treating the clay material separately from the other constituents of the supplementary cementitious material at a temperature sufficient to a) dehydroxylate the clay material to a chrystallographically amorphous material, and b) prevent the formation of high temperature alumino-silicate phases such as mullite. It was found that it is preferable to use clay that has been calcined by heat treating the clay at a temperature sufficient to a) dehydroxylate the clay to a chrystallographically amorphous material, and b) prevent the formation of crystalline high temperature aluminosilicate phases such as mullite. The temperature at which these requirements are met may vary between clay materials but is generally between 400 and 900° C., preferably between 500 and 750° C. when the clay is heat treated before mixing with the limestone. In some cases even higher temperatures than 900° C. may be required to fully dehydroxylate the clay without forming crystalline high temperature phases, e.g. where very rapid heating occurs such as in a flash calciner. As with the calcined clay formed at lower temperatures this clay performs equally well regarding the increased strengths achieved in combination with limestone, and can likewise be characterised by analytical techniques such as X-ray diffraction demonstrating the absence of a crystalline ordering (i.e. absence of diffraction peaks for the untreated clay or high temperature aluminosilicates).

The carbonate material may be selected from the group comprising limestone, magnesium carbonate, calcium magnesium carbonate, or mixtures thereof. According to a preferred embodiment, the carbonate material is limestone.

According to another embodiment of the present invention, the inventive cement comprises 15 to 90% w/w of the supplementary cementitious material. It was surprisingly found that even high contents of supplementary cementitious material could produce a cement with a sufficient strength, in some instances even an increased strength. Accordingly, the cement of the present invention may comprise 5 to 90%, preferably 10 to 90%, more preferably 15 to 90% of the supplementary cementitious material.

The inventors have surprisingly found that the ratio of carbonate material and clay material in the supplementary cementitious material has a significant impact on the strength of the concrete produced therefrom. Thus, according to further embodiments of the present invention, the weight ratio of heat treated clay material to optionally heat treated carbonate material in the supplementary cementitious material is preferably between 0.1 and 10, more preferably between 0.25 and 8, and most preferably between 0.25 and 3.

In a preferred embodiment of the present invention, the heat treated clay material constitutes at least 7% w/w and the optionally heat treated carbonate material constitutes at least 8% w/w of the cement. This combination of minimum contents was found to be linked to a particularly high degree of energy saving and $CO_2$ reduction while maintaining a satisfactory compressive strength of the cement.

According to another embodiment of the present invention the clay material is produced from clay consisting of at least 90% w/w clay minerals belonging to the kaolin group, or the smectite group, or the vermiculite group, or mixtures thereof. Suitable clay materials providing the unexpected good performance with carbonate material such as limestone, have been found to belong to the kaolin group such as kaolinite, dickite, nacrite or halloysite. Even more surprisingly it has been discovered that acceptable strengths can also be obtained using clays of the smectite group including dioctahedral smectites such as montmorillonite and nontronite and trioctahedral smectites such as saponite, or to the vermiculite group. This opens the possibility of using clays which are much more widely available than kaolin since in the conventional art without limestone these clays are unable to provide a high enough contribution to strength for real cuts in $CO_2$ emissions for the same concrete strength achieved by convention Portland cements.

Thus, the clay material used according to the invention may be produced from clay predominately consisting of clay minerals belonging to the kaolin group (such as kaolinite, dickite, nacrite or halloysite), or the smectite group (including dioctahedral smectites such as montmorillonite and nontronite and trioctahedral smectites such as saponite), or the vermiculite group, or mixtures thereof.

According to another embodiment of the present invention the clay material has been heat treated in a rotary kiln or fluid bed furnace.

Preferably, the Portland cement clinker used according to the invention has a $C_3S$ content of greater than 30% by weight, preferably greater than 50%, more preferably greater than 70%, calculated according to the ASTM standard, C150-09. Hence, according to a preferred embodiment of the present invention, the Portland cement clinker has a $C_3S$ content of greater than 70% w/w.

Preferably, the Portland cement clinker used has an aluminium content of less than 10% by weight, preferably less than 8%, more preferably less than 6% expressed as $Al_2O_3$. Hence, according to a preferred embodiment of the present invention, the aluminium content of the Portland cement clinker expressed as $Al_2O_3$ is less than 6% w/w.

Preferably, the cement clinker is ground to a specific surface area using the Blaine method described in EN 196 of 1500-10000 $cm^2$/kg, preferably 2000-9000 $cm^2$/kg, more preferably 3000-7000 $cm^2$/kg. Thus, according to a preferred embodiment of the present invention, the Portland cement clinker is ground to a specific surface area of 3000-7000 $cm^2$/g.

Preferably, the carbonate material is ground to a specific surface area using the Blaine method described in EN 196 of 2000-30000 $cm^2$/kg, preferably 2000-20000 $cm^2$/kg, more preferably 3000-18000 $cm^2$/kg, in particular 3000-15000 $cm^2$/kg. Thus, according to a preferred embodiment of the present invention, the optionally heat treated carbonate material is ground to a specific surface area of 3000-15000 $cm^2$/g.

Preferably, the heat treated clay material is ground separately to a 45 μm residue, determined according to ASTM C 430-96 (2003), of greater than 0.5% by weight of the heat treated clay material, preferably greater than 2%, more preferably greater than 10%, in particular greater than 20%, i.e. the fraction of material coarser than 45 μm is preferably greater than 0.5% by weight of the heat treated clay material, preferably greater than 2%, more preferably greater than 10%, in particular greater than 20%. Such cement results in lower water demand and therefore improved concrete flowability but generally lower strengths. Hence, according to a preferred embodiment of the present invention the heat treated clay material is ground separately to form a clay material having a 45 μm residue constituting more than 20% by weight of the heat treated clay material.

According to another embodiment of the present invention the supplementary cementitious material constitutes more than 35% w/w of the total mass of the cement.

According to a particularly preferred embodiment of the present invention, the cement has a 28-day compressive strength of at least 55 MPa.

According to an advantageous embodiment of the present invention, the Portland cement clinker, the heat treated clay material and the optionally heat treated carbonate material together constitute at least 95% w/w of the total mass of the cement. Cement of this type has been found to exhibit a particularly high compressive strength as well as a strong $CO_2$ reduction potential.

In another aspect, the present invention relates to a concrete material comprising a cement according to the present invention.

In yet another aspect, the present invention relates to a method of producing a cement comprising Portland cement clinker and a supplementary cementitious material comprising the steps of a) providing a carbonate material and a clay material, b) heating a mixture of the clay material and the carbonate material to a temperature of between 400 and 700° C., and c) blending the mixture with a Portland cement clinker. The preferred carbonate material is limestone. Optionally, the obtained mixture may be ground to a surface area of more than 3000 $cm^2/g$ determined by the EN 196 method of determining the Blaine surface area. Optionally any of the individual constituents may be ground separately before blending in which case each of the constituents is preferably ground to a surface area of more than 3000 $cm^2/g$. The present invention also relates to any products obtainable by such a method.

In another aspect, the present invention relates to a method of producing a cement comprising Portland cement clinker and a supplementary cementitious material comprising the steps of a) providing a carbonate material and a clay material, b) heating the clay material separately in such a way that the clay material is substantially dehydroxylated, c) mixing the heat treated clay material with the carbonate material, and d) blending the mixture of c) with a Portland cement clinker. The preferred carbonate material is limestone. Optionally, the obtained mixture may be ground to a surface area of more than 3000 $cm^2/g$ determined by the EN 196 method of determining the Blaine surface area. Optionally any of the individual constituents may be ground separately before blending in which case each of the constituents is preferably ground to a surface area of more than 3000 $cm^2/g$. The present invention also relates to any products obtainable by such a method.

According to a preferred embodiment of the inventive method, the heat treated clay material is an aluminosilicate glass or calcium aluminosilicate glass.

According to another embodiment of the inventive method, the heat treated clay material is calcined clay.

According to another embodiment of the inventive method, the clay material is heated to a temperature sufficient to i) dehydroxylate the clay material to a chrystallographically amorphous material, and ii) prevent the formation of high temperature alumino-silicate phases such as mullite.

According to another embodiment of the inventive method, the heat treated clay material is produced in a rotary kiln or fluid bed furnace.

In another aspect, the present invention relates to a use of the supplementary cementitious material of the present invention for reducing $CO_2$ emissions during the production of cement. The supplementary cementitious material comprises a heat treated clay material and an optionally heat treated carbonate material, wherein the clay material has been heat treated optionally together with the carbonate material in such a way that the heat treated clay material is substantially dehydroxylated while the optionally heat treated carbonate material remains substantially carbonated. When using this supplementary cementitious material in the production of cement, thus reducing the need for energy-intensive Portland cement clinker, considerable reductions in energy consumption and $CO_2$ production have been observed.

In another aspect, the present invention relates to a cement comprising Portland cement clinker and a clinker replacement material, wherein the clinker replacement material comprises a carbonate material and a clay material, the clay material being characterised in that the carbonate material and/or the clay material has been treated in such a way that no chemical reaction occurs between the clay material and the carbonate material. The term "clinker replacement material" has the same meaning as the term "supplementary cementitious material". The surprising effect is found when treating the raw materials in such a way that no chemical reaction occurs between the clay minerals and the limestone, either by calcining the clay separately before mixing with limestone, or by keeping the calcination temperature sufficiently low at less than 700° C. so that no reaction between the constituents takes place.

According to one embodiment, the clay material has been heat-treated separately before mixing with the carbonate material. One way of ensuring that no chemical reaction occurs between the clay minerals and the carbonate material is by processing the clay minerals and the carbonate material separately. The clay material is processed by heat treatment, whereby calcined clay or calcium aluminosilicate glass is formed. Thus, in a preferred embodiment, the invention relates to a cement as defined above, wherein the clay material is heat-treated separately before mixing with the carbonate material.

According to another embodiment the carbonate material and the clay material have been calcined in a mixture at a temperature of less than 800° C., and preferably less than 700° C.

According to another embodiment the clay material has been transformed to a calcium aluminosilicate glass.

EXAMPLES

Example 1

This example describes different cement compositions in which the supplementary cementitious material constitutes 35% w/w of the total mass of the cement. Within the supplementary cementitious material, the relative contents of carbonate material and heat treated clay material are varied from 0 to 100% (lines 2 and 3 in Table 1). The remainder (65% w/w) of the cement consists of Portland cement (Portland cement clinker plus small amounts of gypsum).

The carbonate material used in this example is limestone which has not been heat treated. The limestone is ground separately to a Blaine surface area of 11430 $cm^2/g$.

The clay material in this example is 'Lillebaelt Clay', a fine grained Eocene clay deposit from western Denmark consisting of 40-45% w/w illite, 25-30% w/w kaolinite, and 25-30% w/w smectite. The clay material was calcined at 750° C. for 20 minutes. This heat treated clay material was then ground to a Blaine surface area of 11760 $cm^2/g$.

The reference cement (comparative) used in this example consists of 100% Portland cement containing 5% gypsum and ground to a Blaine surface area of 4140 $cm^2/kg$, and with a mineral composition calculated by the Bogue method according to ASTM C150-09, of 57% $C_3S$, 18% $C_2S$, 7% $C_3A$, 9% $C_4AF$.

TABLE 1

|  | | | | | | | Reference cement (comparative) |
|---|---|---|---|---|---|---|---|
| Limestone [%], Ground separately to an Blaine surface area of 11430 cm$^2$/g | 100 | 70 | 60 | 50 | 40 | 0 | 0 |
| Calcined "Lillebælts" clay [%], Ground separately to an Blaine surface area of 11760 cm$^2$/g and a 45μ residue of 4%. | 0 | 30 | 40 | 50 | 60 | 100 | 0 |
| 28-day compressive strength [MPa] | 47 | 51 | 52 | 55 | 53 | 44 | 64 |
| cement content in concrete given in kg/m$^3$ needed to achieve 35 MPa at a water/cement ratio of 0.50 | 409 | 376 | 369 | 349 | 362 | 436 | 300 |
| Net CO$_2$ emission from cement per m$^3$ concrete | 258 | 240 | 236 | 224 | 234 | 286 | 270 |
| Net CO$_2$ reduction in CO$_2$ emission from cement per m$^3$ concrete compared to 100% Portland cement | 5 | 11 | 12 | 17 | 13 | −6 | |

This example shows that the effect on 28 day EN 196-1 mortar strengths of replacing 35% Portland cement with limestone is slightly better than 35% replacement with calcined 'Lillebaelt' clay (line 4 in Table 1). When this is converted to the amount of cement needed to achieve the same concrete performance, the cement produced from 35% limestone results in a net reduction in CO$_2$ emissions of 4%, whilst the cement produced from 35% calcined "Lilleblts" clay results in an increase in CO$_2$ emissions of 6%. A 50/50 mix of calcined clay and limestone (still at a 35% level of overall clinker replacement) results in a reduction in the net CO$_2$ emission of 17% at the same concrete performance

Example 2

This example describes different cement compositions in which the supplementary cementitious material constitutes 40% w/w of the total mass of the cement. Within the supplementary cementitious material, the relative contents of carbonate material and heat treated clay material are varied from 0 to 100% (lines 2 and 3 in Table 2). The remainder (60% w/w) of the cement according to the present invention consists of Portland cement (Portland cement clinker plus small amounts of gypsum).

The heated clay material in this example was produced from kaolin from the Danish island of Bornholm (metakaolin) by heat treating it to 650° C. for 30 minutes. The kaolinite content was approximately 90% w/w prior to heat treatment.

Both the limestone and the reference Portland cement where taken from the same batch used in Example 1.

TABLE 2

|  | | | | | | Reference (comparative) |
|---|---|---|---|---|---|---|
| Limestone [%] ground separately to an Blaine surface area of 11430 cm$^2$/g | 100 | 76 | 51 | 26 | 0 | 0 |
| metakaolin [%] ground separately to an Blaine surface area of 9570 cm$^2$/g and a 45 μm of 5% | 0 | 24 | 49 | 74 | 100 | 0 |
| 28-day compressive strength [MPa] | 41 | 49 | 58 | 59 | 49 | 57 |
| cement content in concrete given in kg/m$^3$ needed to achieve 35 MPa at a water/cement ratio of 0.50 | 417 | 349 | 295 | 290 | 349 | 300 |
| Net CO$_2$ emission from cement per m$^3$ concrete | 247 | 209 | 179 | 178 | 216 | 270 |
| Net CO$_2$ reduction in CO$_2$ emission from cement per m$^3$ concrete compared to 100% Portland cement | 9 | 23 | 34 | 34 | 20 | |

This example shows that the effect on 28 day mortar EN 196-1 strengths of replacing 40% Portland cement with metakaolin results in a net reduction in CO$_2$ emission of 20% compared to 9% for limestone. The best results however are achieved at limestone/metakaolin ratios of 26 and 51% giving a net reduction in CO$_2$ emission of 34%. Even higher reductions are probably achieved at an optimum limestone/metakaolin ratio of 35 to 40% limestone.

Example 3

This example describes different cement compositions in which the supplementary cementitious material constitutes 35% w/w of the total mass of the cement. Within the supplementary cementitious material, the relative contents of carbonate material and heat treated clay material are varied from 0 to 100% (lines 2 and 3 in Table 3). The remainder (65% w/w) of the cement according to the present invention consists of Portland cement (Portland cement clinker plus small amounts of gypsum).

The clay material in this example is 'Holmehus clay' from central Jutland, which consists of 85 to 90% smectite, with the remaining 10 to 15% consisting of minor illite and quartz. The clay material was calcined at 750° C. for 20 minutes.

Both the limestone and the reference Portland cement where taken from the same batch used in Example 1.

TABLE 3

|  |  |  |  | Reference (comparative) |
|---|---|---|---|---|
| Limestone [%], Ground separately to an Blaine surface area of 11430 cm$^2$/g | 100 | 50 | 0 | 0 |
| Calcined "Holmehus" clay [%], Ground separately to an Blaine surface area of 9240 cm$^2$/g | 0 | 50 | 100 | 0 |
| 28-day compressive strength [MPa] | 48 | 57 | 44 | 64 |

Example 4

It has also been found that if the clay is heat treated to very high temperatures in excess of 1100° C. to form a glass of similar composition, that the same general relationships are found between strengths and chemical composition as shown in this example.

Here, different cement compositions are described in which the supplementary cementitious material constitutes 35% w/w of the total mass of the cement. Within the supplementary cementitious material, the relative contents of carbonate material and heat treated clay material are varied from 0 to 100% (lines 2 and 3 in Table 4). Also, one supplementary cementitious material consists of 50% w/w limestone and 50% w/w glass produced from 'Holmehus Clay' (second last column in Table 4). The remainder (65% w/w) of the cement consists of Portland cement (Portland cement clinker plus small amounts of gypsum).

Both the limestone and the reference Portland cement where taken from the same batch used in Example 1.

TABLE 4

|  |  |  |  |  | Reference (comparative) |
|---|---|---|---|---|---|
| Limestone [%], Ground separately to an Blaine surface area of 11430 cm$^2$/g | 100 | 50 | 0 | 50 | 0 |
| Calcined "Holmehus" clay [%], Ground separately to an Blaine surface area of 9240 cm$^2$/g | 0 | 50 | 100 | 0 | 0 |
| Glass produced at 1300° C. from Holmehus" clay and rapidly cooled in air and ground to a specific surface of 10090 cm$^2$/g |  |  |  | 50 |  |
| 28-day compressive strength [MPa] | 48 | 57 | 44 | 66 | 64 |

The invention claimed is:

1. A cement consisting of:
a Portland cement clinker; and
a supplementary cementitious material, consisting of:
   a) a calcined clay produced at a temperature of between 500° C. and 900° C.; and
   b) a carbonate material having a specific surface area of 3000-15000 cm$^2$/g determined using the Blaine method described in EN 196, the carbonate material being selected from the group consisting of limestone, magnesium carbonate, calcium magnesium carbonate, and mixtures thereof, in a weight ratio to the calcined clay of 1 to between 0.25 and 3;
wherein only the clay material has been heat treated.

2. The cement according to claim 1, wherein the calcined clay material is calcined clay produced at a temperature of between 500° C. and 750° C.

3. The cement according to claim 1, wherein the supplementary cementitious material is present in an amount of 15 to 90% w/w.

4. The cement according to claim 1, wherein the calcined clay material constitutes at least 7% w/w of the cement and the carbonate material constitutes at least 8% w/w of the cement.

5. The cement according to claim 1, wherein the calcined clay material is produced from clay material consisting of at least 90% w/w clay minerals selected from the group consisting of kaolin clays, smectite clays, vermiculite clays and mixtures thereof.

6. The cement according to claim 1, wherein the Portland cement clinker has a $C_3S$ content of greater than 70% w/w.

7. The cement according to claim 1, wherein the Portland cement clinker has an aluminium content expressed as $Al_2O_3$ less than 6% w/w.

8. The cement according to claim 1, wherein the Portland cement clinker is ground to a specific surface area of 3000-7000 cm$^2$/g determined using the Blaine method described in EN 196.

9. The cement according to claim 1, wherein the calcined clay material produced at a temperature between 500° C. and 900° C. is ground separately to form a clay material having a 45 μm residue constituting more than 20% by weight of the calcined clay material.

10. The cement according to claim 1, wherein the supplementary cementitious material constitutes more than 35% w/w of the total mass of the cement.

11. The cement according to claim 1, wherein the Portland cement clinker, the calcined clay material and the carbonate material together constitute at least 95% w/w of the total mass of the cement.

12. A concrete material comprising a cement according to claim 1.

13. A method of producing a cement, comprising: preparing a cement, consisting of a Portland cement clinker; and a supplementary cementitious material, by the following steps:
   a) grinding a carbonate material selected from the group consisting of limestone, magnesium carbonate, calcium magnesium carbonate and mixtures thereof, to a specific surface area of 3000-15000 cm$^2$/g determined using the Blaine method described in EN 196; and
   b) heating a clay material separately at a temperature of between 500° C. and 900° C. to produce a calcined clay material,
   c) mixing the calcined clay material with the carbonate material in a weight ratio of calcined clay material to carbonate material of 1 and to between 0.25 and 3 to form the supplementary cementitious material, and d) blending the supplementary cementitious material with the Portland cement clinker.

14. The method according to claim 13, further comprising the step of producing the calcined clay material in a rotary kiln or fluid bed furnace.

15. The method according to claim 13, wherein the clay material to be heated consists of at least 90% w/w clay minerals selected the group consisting of kaolin clays, smectite clays, vermiculite clays and mixtures thereof.

16. The method according to claim 13, further comprising the step of grinding the calcined clay material to form a calcined clay material having a 45 μm residue constituting more than 20% by weight of the calcined clay material.

17. The method according to claim 13, further comprising the step of grinding the Portland cement clinker to a specific surface area of 3000-7000 cm$^2$/g determined using the Blaine method described in EN 196.

18. The method according to claim 13, wherein the supplementary cementitous material is added during the blending step in an amount of 15 to 90% by weight of the total cement.

19. The method according to claim 13, wherein the calcined clay material constitutes at least 7% w/w of the cement and the carbonate material constitutes at least 8% w/w of the cement.

20. The method according to claim 13, wherein the Portland cement clinker has an aluminium content expressed as $Al_2O_3$ less than 6% w/w.

21. The method according to claim 13, wherein the Portland cement clinker, the calcined clay material and the carbonate material together constitute at least 95% w/w of the total mass of the cement after the blending step.

\* \* \* \* \*